(12) United States Patent
Houdebine et al.

(10) Patent No.: US 11,736,148 B2
(45) Date of Patent: Aug. 22, 2023

(54) CONTACTLESS COMMUNICATION DEVICE MODE SWITCHING MANAGEMENT

(71) Applicants: STMICROELECTRONICS RAZVOJ POLPREVODNIKOV D.O.O., Ljubljana (SI); STMICROELECTRONICS SA, Montrouge (FR)

(72) Inventors: Marc Houdebine, Crolles (FR); Kosta Kovacic, Orehova vas (SI); Florent Sibille, Grenoble (FR)

(73) Assignees: STMICROELECTRONICS SA, Montrouge (FR); STMICROELECTRONICS RAZVOJ POLPREVODNIKOV D.O.O., Ljubljana (SI)

( * ) Notice: Subject to any disclaimer, the term of this patent is extended or adjusted under 35 U.S.C. 154(b) by 198 days.

(21) Appl. No.: 17/385,122

(22) Filed: Jul. 26, 2021

(65) Prior Publication Data
US 2022/0029660 A1 Jan. 27, 2022

(30) Foreign Application Priority Data
Jul. 27, 2020 (FR) ..................................... 2007898

(51) Int. Cl.
*H04B 5/00* (2006.01)
*H04L 7/033* (2006.01)
*H04L 7/04* (2006.01)

(52) U.S. Cl.
CPC ......... *H04B 5/0056* (2013.01); *H04L 7/0331* (2013.01); *H04L 7/04* (2013.01)

(58) Field of Classification Search
CPC ...... H04B 5/0056; H04B 5/0068; H04B 5/02; H04B 5/0031; H04L 7/0331; H04L 7/04; G06K 7/10237; G06K 7/10198; H03L 7/23
USPC .......................................................... 455/41.1
See application file for complete search history.

(56) References Cited

U.S. PATENT DOCUMENTS

| | | |
|---|---|---|
| 2014/0218080 A1 | 8/2014 | Choke et al. |
| 2016/0241384 A1* | 8/2016 | Frantzeskakis ...... H04B 5/0031 |
| 2018/0006801 A1* | 1/2018 | Hung ................. G06K 19/0723 |

* cited by examiner

*Primary Examiner* — Eugene Yun
(74) *Attorney, Agent, or Firm* — Slater Matsil, LLP

(57) ABSTRACT

An embodiment device comprises a phase locked loop and a frequency locked loop having in common the same controlled oscillator. The device is firstly placed in the card emulation mode at the beginning of a communication between the contactless communication device and a contactless reader, the firstly placing comprising synchronizing within the contactless device, an ALM carrier frequency with a reader carrier frequency by operating at least the phase locked loop, and upon reception by the contactless communication device of an indication sent by the reader indicating a further communication in a peer to peer mode with the reader, the device is secondly placed in the peer to peer mode, the secondly placing including deactivating the phase locked loop and operating the frequency locked loop with a reference clock signal and a frequency set point depending on the reader carrier frequency and the frequency of the reference clock signal.

21 Claims, 10 Drawing Sheets

CONTACTLESS COMMUNICATION DEVICE MODE SWITCHING MANAGEMENT

CROSS-REFERENCE TO RELATED APPLICATIONS

This application claims the benefit of French Application No. 2007898, filed on Jul. 27, 2020, which application is hereby incorporated herein by reference.

TECHNICAL FIELD

Embodiments of the disclosure relate generally to the field of contactless communication, for example near field communication (NFC), and more particularly to the management of the switching between a card emulation (CE) mode and a peer to peer (P2P) mode.

BACKGROUND

Near field communication, better known to those skilled in the art under the name NFC (Near Field Communication), is a wireless connectivity technology that allows communication over a short distance, for example 10 cm, between electronic devices, such as contactless smart cards or labels or mobile devices, and readers.

NFC technology is particularly suitable for connecting any type of user device and allows for quick and easy communications.

A contactless device is a device capable of exchanging information via an antenna with a contactless reader, according to a contactless communication protocol.

An NFC device, which is a contactless device, is a device compatible with NFC technology.

NFC technology is an open standard technology platform in ISO/IEC 18092, ISO/IEC 21481, NFC Forum and EMVCo but incorporates many existing standards such as the Type A and Type B protocols defined in ISO-14443 or FeliCA JIS X6319-4 (type F) which can be communication protocols that can be used in NFC technology.

Contactless technology can also be used in Radio Frequency IDentification (RFID) devices compatible with ISO 15693 and ISO 18000-3.

When transmitting information between a reader and a device, the reader generates a magnetic field via its antenna which is generally in the standards conventionally used, a sine wave (the carrier) at 13.56 MHz.

To transmit information from the reader to the device, the reader uses an amplitude modulation of the carrier.

The device comprises a processor configured to demodulate the received carrier in order to obtain the data transmitted from the reader.

For an information transmission from the device to the reader, the reader generates the magnetic field (the carrier) without modulation.

The device antenna then modulates the field generated by the reader, according to the information to be transmitted. The frequency of this modulation corresponds to a subcarrier of the carrier. The frequency of this subcarrier depends on the communication protocol used and can be for example equal to 848 kHz.

Two modes of operation are then possible, a passive mode or an active mode.

In the passive mode, the device retro-modulates, by modifying the load connected to the terminals of the device antenna, the wave coming from the reader to transmit information and does not integrate, for the transmission of information, the transmitter itself, or emitter, capable for example of generating its own magnetic field during the broadcast. Such a device devoid of transmitter is called passive device, as opposed to an active device which includes a transmitter.

Generally, a passive device is devoid of power because it uses the wave from the reader to power its integrated circuit.

In the active mode of operation, both the reader and the active device generate an electromagnetic field. Generally, this mode of operation is used when the active device is provided with a power source, for example a battery.

Each of the NFC devices (reader and device) transmits the data using a modulation scheme. Here again, the modulation results in an effect similar to load modification and this is then referred to as active load modulation (ALM) communication.

Compared to a passive communication mode, larger operating distances of up to 20 cm are obtained depending on the protocol used.

Moreover, the use of active load modulation makes it possible to use very small antennas.

ALM needs to be used in case signal generated by passive load modulation is not strong enough to be detected by a reader. This is the case when device's antenna is small or located in a challenging environment.

Most contactless communication devices, in particular NFC enabled devices (e.g. mobile phones, smart watches), include a mode where they perform Card Emulation (CE).

Recently more and more NFC enabled devices have employed Active Load Modulation (ALM) to boost the communication performance when in CE mode.

A contactless communication device, for example an NFC enable device, such as a mobile phone, can be used also in a peer to peer (P2P) mode.

The difference between the CE mode and the P2P mode is illustrated in FIGS. 1 and 2.

In FIG. 1, which illustrates the CE mode, the contactless device starts in the CE mode when it enters the reader field. When starting in the CE mode, the contactless device performs a synchronization between an ALM carrier frequency (for example 13.56 MHz) and the reader carrier frequency (for example 13.56 MHz), i.e. a locking of the output signal of a controlled oscillator of the contactless device onto the phase and frequency of a clock signal received from the reader.

The communication between the reader and the device in the CE mode requires a phase alignment between the ALM signal and the reader signal and also a high reader clock purity to be able to decode CE retro-modulation resulting from the device response in the CE mode.

In FIG. 2, the contactless device starts in the CE mode, and switches in the P2P mode upon reception of a specific command sent by the reader which is in this case a so called P2P initiator.

As illustrated in FIG. 2, once the reader field is switched off, the controlled oscillator of the device needs to lock on a local clock in less than 56 microseconds.

And in the P2P mode, there is no simultaneous transmission of the reader field and the device field, and thus no need of phase alignment.

While a phase locked loop is conventionally used to perform the above mentioned synchronization at the start of the operation in the CE mode, conventional contactless device are provided with a supplemental phase locked loop to switch in less than 56 microseconds from the CE mode onto the P2P mode, i.e. to lock on the external clock.

However, such a conventional solution leads to increase the power consumption because this supplemental phase locked loop is always switched on in CE mode although it is not useful in the CE mode.

This also leads to an increase of the area.

Further an extra time is required to switch from one phase locked loop to another, and the two phase locked loops may pollute each other.

There is accordingly a need to propose a solution which can remedy those disadvantages as much as possible.

SUMMARY

According to an aspect a method of managing the operation of a contactless communication device is proposed.

The contactless communication device is configured to support a card emulation (CE) mode using active load modulation (ALM) and a peer to peer (P2P) mode.

The contactless communication device comprises a phase locked loop and a frequency locked loop having in common the same controlled oscillator.

The method according to this aspect comprises firstly placing the contactless communication device in the card emulation mode at the beginning of a communication between the contactless communication device and a contactless reader.

This firstly placing comprises synchronizing within the contactless device, an ALM carrier frequency with a reader carrier frequency by operating at least the phase locked loop.

And upon reception by the contactless communication device of an indication sent by the reader indicating a further communication in a peer to peer mode with the reader, the method comprises secondly placing the contactless communication device in the peer to peer mode, the secondly placing including deactivating the phase locked loop and operating the frequency locked loop with a reference clock signal and a frequency set point depending on the reader carrier frequency and the frequency of the reference clock signal.

Thus, the contactless communication device is provided with phase locked loop and a frequency locked loop having the same common controlled oscillator.

As is well known by one skilled in the art, a phase locked loop is different from a frequency locked loop.

More precisely, a phase locked loop locks the phase of the loop oscillator on the phase of a reference clock. Of course, when the phase of the loop oscillator is locked on the phase of the reference clock, the frequency of the oscillator is also locked on the frequency of the reference clock.

A frequency locked loop locks the frequency of the loop oscillator on the frequency of the reference clock, but the phase does not matter. In other words, when the frequency of the loop oscillator is locked on the frequency of the reference clock, the phase difference between the phase of the oscillator and the phase of the reference clock does not matter and may be any value, typically not null.

And in the CE mode, both locked loops or only the phase locked loop are used while in the P2P mode, the phase locked loop is deactivated and only the frequency locked loop is used.

There is no need to have a supplemental phase locked loop with the corresponding disadvantages mentioned above, and when switching in the P2P mode, the common controlled oscillator is already calibrated and has the right frequency.

Thus, the lock of the frequency locked loop is fast and takes a duration smaller than 56 microseconds.

The frequency set point may be the last value of a loop filter of the phase locked loop before deactivation of the PLL.

However, in order to reduce the perturbation on the device clock signal output by the device due to fluctuation on the control word of the frequency locked loop just before switching in the P2P mode, it could be preferable to store the desired frequency set point in a memory (a register for example) and to switch onto the register when entering the P2P mode.

According to an embodiment, the controlled oscillator is controlled for outputting an output oscillator signal having a frequency equal to the reader carrier frequency or to a multiple of the reader carrier frequency.

For example, if the reader frequency is equal to 13.56 MHz, the targeted frequency of the output oscillator signal may be equal to 64*13.56 MHz.

The frequency set point may be the ratio between the frequency of the output oscillator signal and the frequency of the reference clock signal.

The ratio may be an integer or may have a decimal part.

For example, if the frequency of the reference clock signal is equal to 18.08 MHz, the ratio is an integer equal to 48 (64*13.56/18.08).

As indicated above, in the firstly placing it is not compulsory to operate the frequency locked loop, but the reference clock signal, although not used by the frequency locked loop in the first placing, needs to be present when switching in the P2P mode for being used by the frequency locked loop.

In other words, according to an embodiment, the reference clock signal is provided by reference clock generator, for example a quartz crystal, and the firstly placing comprises not operating the frequency locked loop and switching on the reference clock generator for it to be ready to deliver the reference clock signal to the frequency locked loop during the secondly placing.

For example, the reference clock generator may be switched on at the beginning of CE mode starting step.

According to another embodiment, the synchronizing may include also operating the frequency locked loop with the reference clock signal.

In other words, in such embodiment, both phase locked loop and frequency locked loop operate in the first placing for performing the synchronization between the ALM carrier frequency and the reader carrier frequency, i.e. performing a synchronization in phase and frequency between the output signal of the controlled oscillator of the contactless device (and thus the clock signal output by the contactless device) and the clock signal received from the reader.

As indicated above, there is no need to have a supplemental phase locked loop with the corresponding disadvantages mentioned above, and when switching in the P2P mode, the frequency locked loop is already calibrated and settled.

Accordingly, when the P2P mode is activated there is no disturbance of the output oscillator signal, and thus the ALM output clock.

This is thus a more robust solution for this transition from CE mode to P2P mode.

The architecture of the contactless communication device comprising switchable phase locked loop and frequency locked loop permits also to configure the contactless communication device as a P2P initiator (P2P reader).

Thus, according to another aspect, a method of managing the operation of a contactless communication device is proposed.

As indicated above, the contactless communication device is configured to support a card emulation (CE) mode using active load modulation (ALM) and a peer to peer (P2P) mode and comprises a phase locked loop and a frequency locked loop having in common the same controlled oscillator.

The method according to this another aspect comprises configuring the contactless communication device as a peer to peer reader, the configuring comprising not using the phase locked loop and operating the frequency locked loop with a reference clock signal and a frequency set point depending on a desired reader carrier frequency, for example 13.56 MHz, and the frequency of the reference clock signal.

As indicated above and according to an embodiment, the controlled oscillator is controlled for outputting an output oscillator signal having a frequency equal to the desired reader carrier frequency or to a multiple of the desired reader carrier frequency, and the frequency set point is a ratio between the frequency of the output oscillator signal and the frequency of the reference clock signal.

Whatever the aspect, the method may comprise storing the frequency set point in a memory.

According to another aspect, it is proposed a contactless communication device, configured to support a card emulation (CE) mode using active load modulation (ALM) and a peer to peer (P2P) mode and comprising a controllable configurable module including a phase locked loop and a frequency locked loop having in common the same controlled oscillator.

The module has a first card emulation configuration in which the phase locked loop operates and the frequency locked loop operates with the reference clock signal, for synchronizing an ALM carrier frequency with a reader carrier frequency, and a first peer-to-peer configuration in which only the frequency locked loop operates with the reference clock signal and a frequency set point depending on a reader carrier frequency and the frequency of the reference clock signal.

The controller is configured for placing the configurable module in the first card emulation configuration at the beginning of a communication between the contactless communication device and a contactless reader, and for placing the configurable module in the first peer to peer configuration upon reception by the contactless communication device of an indication sent by the reader indicating a further communication in a peer to peer mode with the reader.

According to another aspect a contactless communication device is proposed, which is configured to support a card emulation mode using active load modulation (ALM) and a peer to peer mode.

The contactless communication device comprises a controllable configurable module including a phase locked loop and a frequency locked loop having in common the same controlled oscillator.

The module has a second card emulation configuration in which only the phase locked loop operates for synchronizing an ALM carrier frequency with a reader carrier frequency, and a first peer-to-peer configuration in which only the frequency locked loop operates with a reference clock signal and a frequency set point depending on a reader carrier frequency and the frequency of the reference clock signal.

The contactless communication device comprises also a controller configured for placing the configurable module in the second card emulation configuration at the beginning of a communication between the contactless communication device and a contactless reader, and for placing the configurable module in the first peer-to-peer configuration upon reception by the contactless communication device of an indication sent by the reader indicating a further communication in a peer to peer mode with the reader.

According to an embodiment, the contactless communication device further comprises reference clock generator configured, when switched on, to provide the reference clock signal, and the controller is configured, when the module is placed in second card emulation configuration, to switch on the reference clock generator for it to be ready to deliver the reference clock signal to the frequency locked loop when the module switches in its first P2P configuration.

According to another aspect it is proposed a contactless communication device, configured to support a card emulation (CE) mode using active load modulation (ALM) and a peer to peer (P2P) mode and comprising a controllable configurable module including a phase locked loop and a frequency locked loop having in common the same controlled oscillator.

The module has a second P2P configuration in which only the frequency locked loop operates with a reference clock signal and a frequency set point depending on a desired reader carrier frequency and the frequency of the reference clock signal.

The controller is configured for placing the configurable module in the second peer to peer configuration for making the contactless communication device acting as a peer to peer reader.

According to an embodiment, the controlled oscillator is configured to output an output oscillator signal having a frequency equal to the reader carrier frequency or to a multiple of the reader carrier frequency, and the frequency set point is a ratio between the frequency of the output oscillator signal and the frequency of the reference clock signal.

The contactless communication device may comprise a memory for storing the frequency set point.

The contactless communication device may be a mobile phone, a tablet, a connected watch, an IOT (Internet Of Things) device, or any other communication device powered with a battery, without these examples being limiting.

BRIEF DESCRIPTION OF THE DRAWINGS

Other advantages and features of the invention will become apparent upon reading the detailed description of embodiments and their implementation, which are in no way limiting, and from the appended drawings in which.

DETAILED DESCRIPTION OF ILLUSTRATIVE EMBODIMENTS

Figure 1:
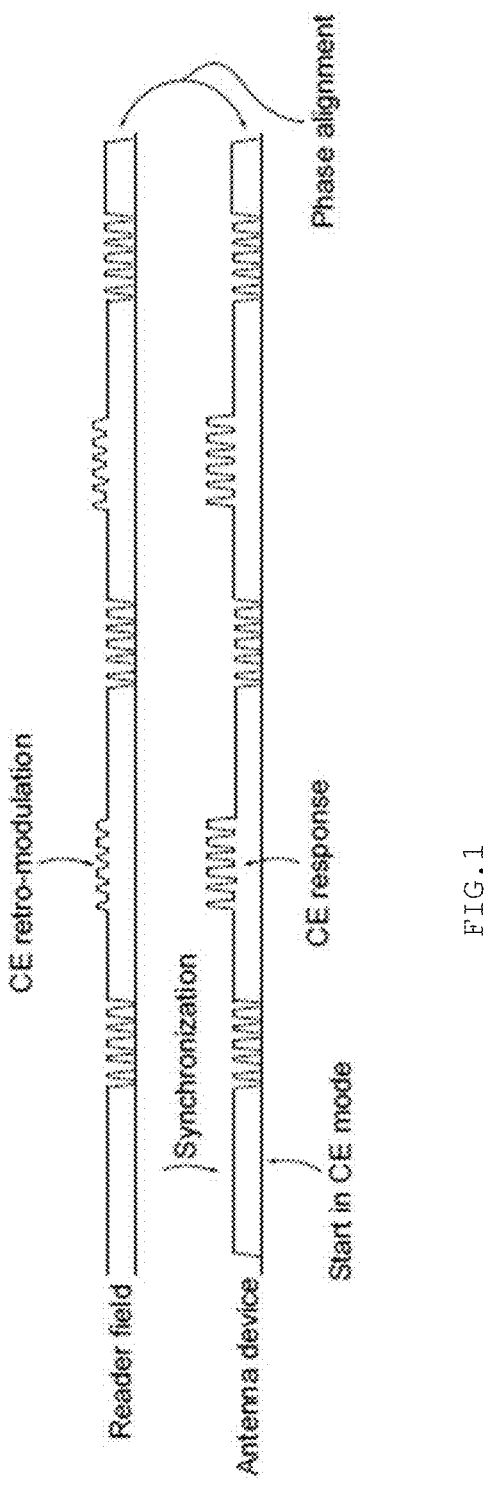
FIG. 1 illustrates the CE mode.
Figure 2:
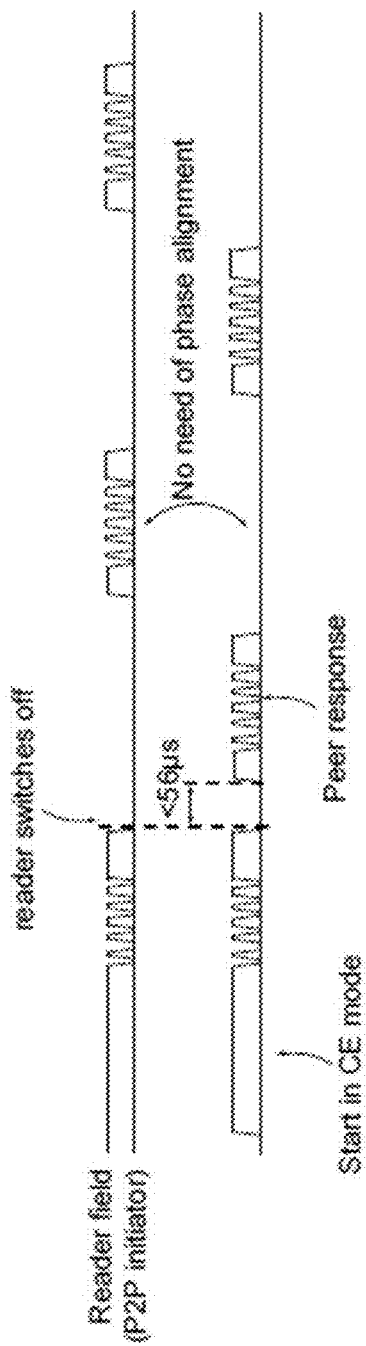
FIG. 2 illustrates the P2P mode.
Figure 3:
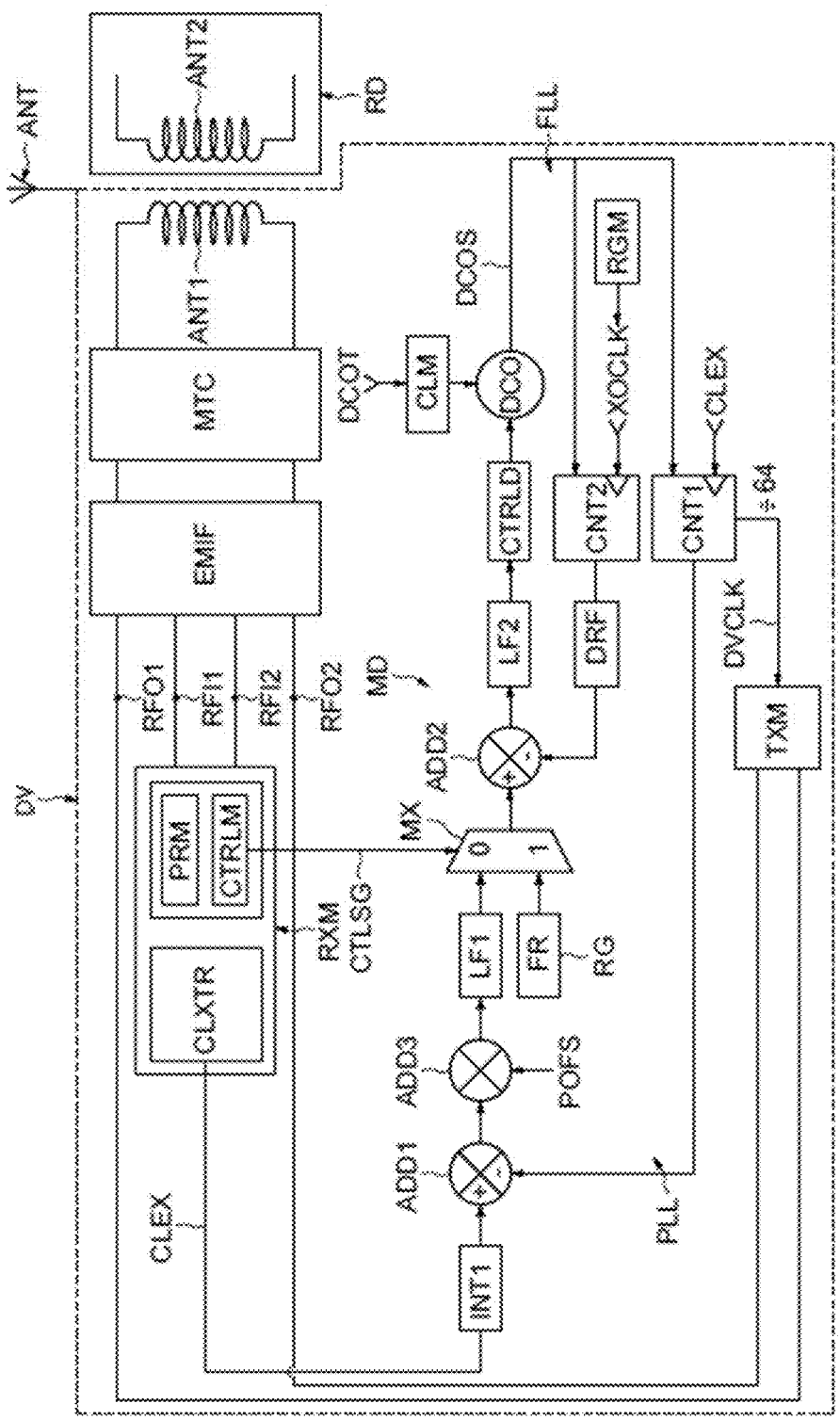
FIG. 3 illustrates an embodiment contactless communication device.

In FIG. 3, the reference DV denotes a contactless communication device, for example a mobile cellular phone, comprising an antenna ANT for telephonic communications.

This telephone is also configured to support a card emulation mode, called CE mode, using active load modulation, called ALM, and a peer to peer mode, called P2P mode.

In those CE mode and P2P mode, the contactless device DV communicates with a contactless reader RD through respective antennas, for example NFC antennas, ANT1 and ANT2.

The contactless device DV comprises a conventional impedance matching circuit MTC connected to its antenna ANT1 as well as a conventional EMI (ElectroMagnetic Interference) filter EMIF connected to the impedance matching circuit MTC.

The filter EMIF is nevertheless optional.

The filter EMIF is coupled to two output terminals RFO1 and RFO2 and to two input terminals RFI1 and RFI2.

The contactless device DV further comprises receiver RXM having the two input terminals RFI1 and RFI2 and configured to process the RF signal output by the filter EMIF.

The receiver RXM, realized for example by a processor and/or logic circuits, comprises a conventional clock extractor CLXTR configured to extract from the RF signal received by the receiver RXM, a clock signal CLEX which is the reader clock signal.

This reader clock signal CLEX has for example a frequency equal to 13.56 MHz to within a tolerance (for example +/−7 KHz).

The receiver RXM comprises also a processor PRM configured to process the data contained in the RF signal.

The receiver RXM comprises also controller CTRLM, configured to deliver a control signal CTLSG for configuring a configurable module MD.

The contactless device comprises also transmitter TXM, known per se, having the two output terminals RFO1 and RFO2 and configured to process the data to be transmitted to the reader RD.

The transmitter DM receives also a device clock signal DVCLK having also, when synchronized on the reader signal CLEX, the frequency equal to 13.56 MHz to within the tolerance.

The configurable module MD includes a phase locked loop PLL and a frequency locked loop FLL having in common the same controlled oscillator DCO.

This oscillator DCO, for example a ring oscillator, is here a numerically controlled oscillator, but it could be also a voltage-controlled oscillator.

In this example, the controlled oscillator DCO is configured to output an output oscillator signal DCOS having a frequency equal to N*13.56 MHz. N is preferably an integer equal or greater than 1, for example equal to 64.

N could be also fractional advantageously in association with a delta sigma converter to retrieve the average value.

In the disclosed embodiment, the phase locked loop PLL comprises an integrator INT1, a loop filter LF1, the controlled oscillator DCO and a first counter CNT1 receiving, on the one hand, the output oscillator signal DCOS and on the other hand the reader clock signal CLEX.

The output of the first counter CNT1 is looped back onto the output of the integrator INT1 via a first adder ADD1.

In the text below, and expressed in loose terms compared to the language normally used by the person skilled in the art, the term "adder" encompasses the "summation" function or the "subtraction" function, according to the + or − signs appearing at the inputs of the adder.

Furthermore, optionally, an adder ADD3 allows a phase shift POFS to be added, representing the phase shift caused by the components disposed between the antenna ANT1 and the phase locked loop PLL.

The frequency locked loop FLL comprises here a loop filter LF2, the control oscillator DCO a second counter CNT2 receiving on one end the output oscillator signal DCOS and on another end a reference clock signal XOCLK delivered by reference clock generator RGM, for example a quartz crystal.

The two loop filters LF1 and LF2 are here filters which have a conventional structure (typically integrating stabilizing filters) and, in order to avoid as much as possible any stability issue, preferably designed such that the cut-off frequency of the loop FLL is greater than the cut-off frequency of the loop PLL. Thus the temporal responses of the two loops PLL and FLL are driven by the loop PLL.

The output of the counter CNT2 is looped back to the input of the loop filter LF2 via a derivative filter DRF and an adder ADD2.

In the present case, whereas the output of the first counter CNT11 delivers the phase difference between the signals DCOS and CLEX, one of the flip flops of the counter CNT11 allows the delivery of the device clock signal DVCLK, the frequency of which is divided by N, for example here 64, in relation to the frequency of the signal DCOS in such a way as to obtain the frequency of 13.56 MHz to within the tolerance.

However, a divider in parallel with the counter CNT11 could also be used to perform this division by N.

As illustrated diagrammatically in FIG. 3, the configurable module MD comprises here a multiplexer MX controlled by the control signal CTLSG and having a first input coupled to the output of the loop filter LF1 and a second input coupled to a register RG configured to store a frequency set point FR.

The output of the multiplexer is connected to the adder ADD2.

Depending on the value of the control signal CTLSG, either both phase locked loop PLL and frequency loop FLL operate or only the frequency loop FLL operates.

Figure 4:
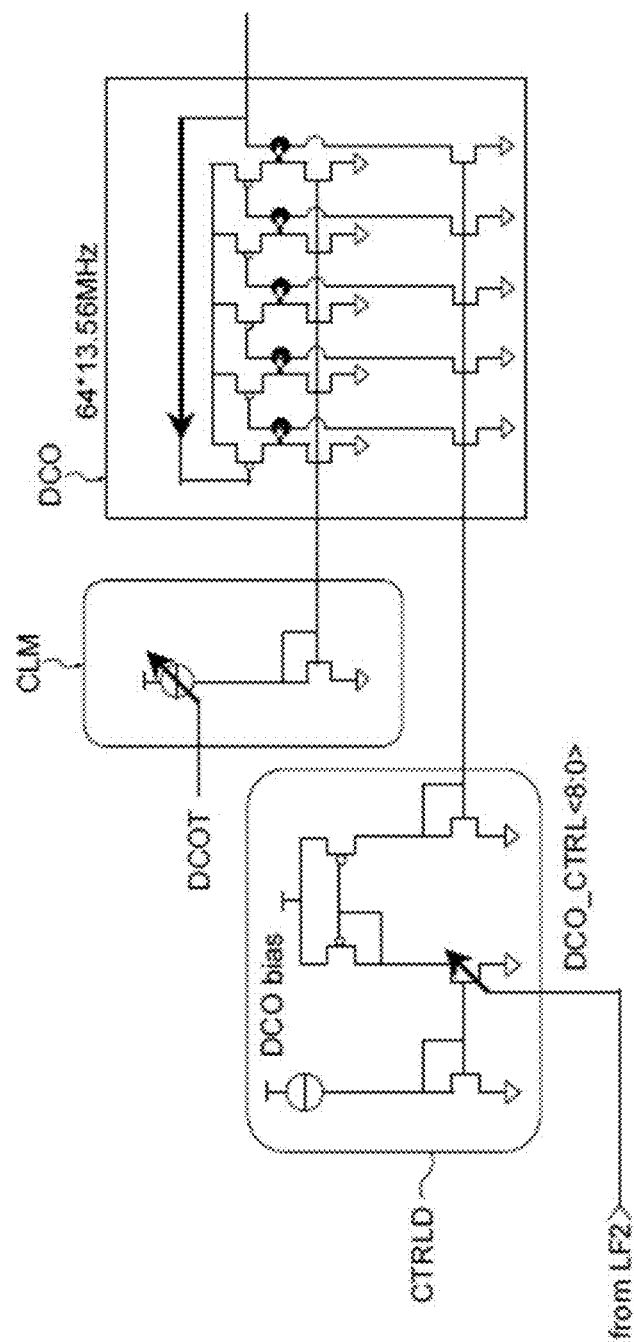
FIG. 4 illustrates a calibration circuit and an oscillator controller coupled to a control oscillator.
Figure 5:
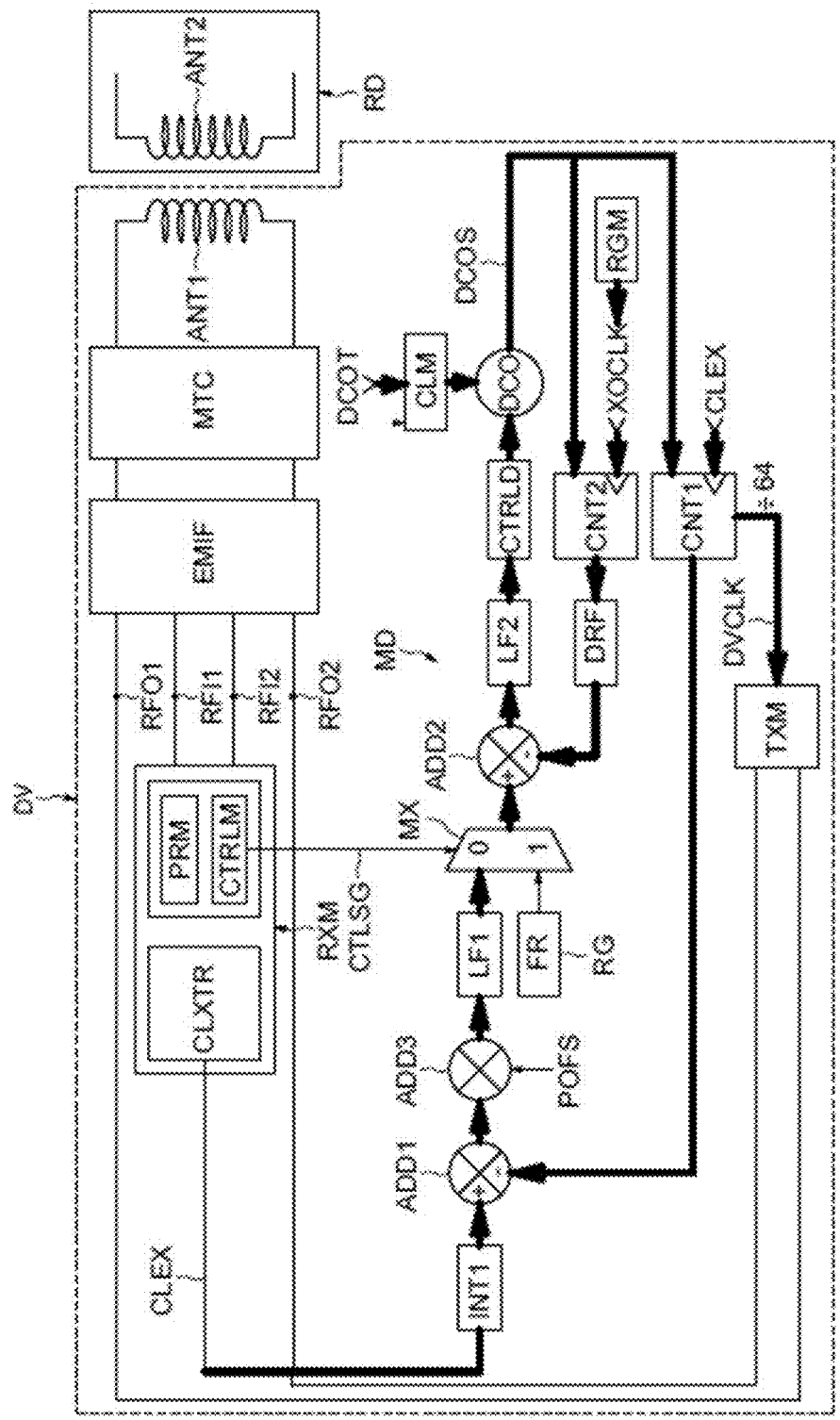
FIG. 5 illustrates the embodiment of FIG. 3 with control signal CTLSG having the value "0"

This will be illustrated more in details on FIGS. 4 and 5.

As illustrated also on FIG. 3, module MD comprises also calibration circuit CLM and oscillator controller CTRLD coupled to the control oscillator DCO.

The calibration circuit receives in this example, a calibration signal DCOT.

An example of those components is diagrammatically illustrated in FIG. 4.

More precisely, calibration CLM comprises essentially a current source controlled by the calibration signal DCOT.

The function of the calibration circuit is to re-center the frequency of the output oscillator DCO around 64*13.56 MHz so that the oscillator controller CTRLD which receive a control word DCO_CTRL, for example on 9 bits, from the output of the filter LF2, can finally track the output frequency of 64'13.56 MHz thanks to the loops PLL and FLL.

More precisely, the calibration signal DCOT permits to perform a centering of the oscillator frequency in order to address the 13.56 MHz within the DCO_control range.

We refer now to FIG. 5 which illustrates (bolt lines) a configuration of the module MD obtained when the control signal CTLSG has the value "o".

In such a case, both phase locked loop PLL and frequency locked loop FLL operate.

This corresponds to a first card emulation configuration of the module MD.

And, this first card emulation configuration is applied at the beginning of a communication between the reader RD and the contactless device DV.

In this first CE configuration, the frequency locked loop FLL operates with the reference clock signal XOCLK.

In this first CE configuration, a synchronization is performed between the reader carrier frequency and the ALM carrier frequency. More precisely, this synchronization is a synchronization of the output oscillator signal DCOS, and thus the device clock signal DVCLK, onto the phase and the frequency of the reader clock signal CLEX At the beginning of the synchronization, the control oscillator is calibrated by the calibration circuit CLM by using the calibration signal DCOT in order to re-center the frequency of the output oscillator signal around 64*13.56 MHz and after that, a fine control is performed by the controller CTRLD as explained with reference to FIG. 4.

During this synchronization, the two loops PLL and FLL operate simultaneously but only the loop PLL locks the oscillator DCO. As a result, the output oscillator signal DCOS is phase locked and frequency locked by the loop PLL onto the reader clock signal CLEX Since the stabilities of both loop PLL and loop FLL are ensured by the two loop filters LF1 and LF2, the frequency ratio between the frequency of the signal DCOS and the frequency of the reference signal XOCLK, obtained at the output of the filter LF1, acts as a control word for the frequency locked loop FLL.

Figure 6:
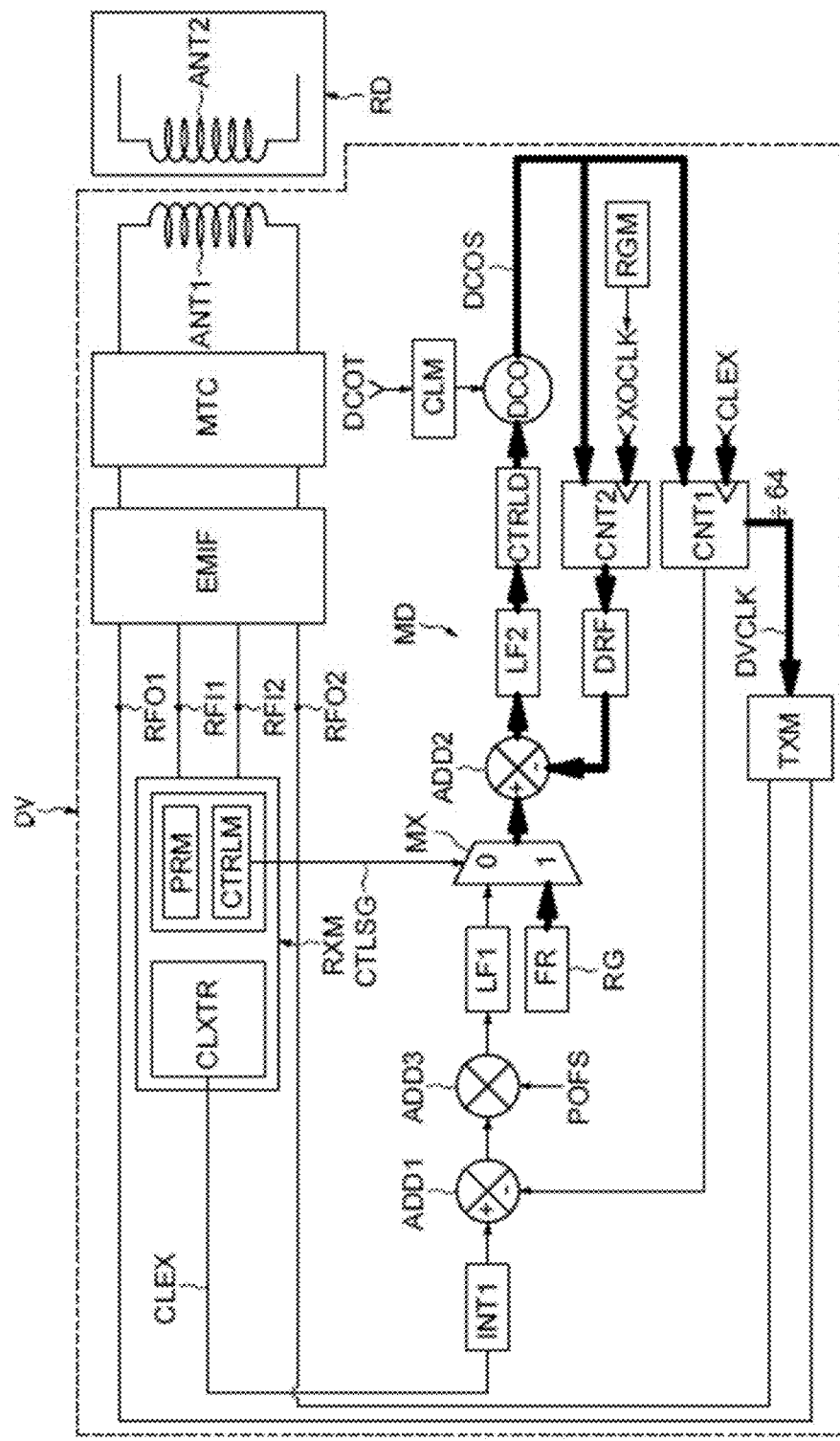
FIG. 6 illustrates the embodiment of FIG. 3 with control signal CTLSG having the value "1"

When the reader sent a specific command (for example a so-called ATR_REQ command in ISO-18092), for initiating a communication in a P2P mode, the controller CTRLM switches the value of the control signal CTLSG to 1 such that, illustrated in FIG. 6, the loop PLL is de-activated and only the loop FLL operates with the reference clock signal XOCLK.

This corresponds to a first P2P configuration.

The reader field is switched off.

Further, the frequency set point FR stored in the register RG, which corresponds to the ratio between the frequency of the output oscillator signal DCOS and the frequency of the reference clock signal XOCLK (ratio equal to 48 here) is delivered to the loop FLL.

Because the loop FLL was already settled in the first CE configuration mode, the device DV is ready to communicate in P2P mode in less than 56 µs, in fact instantly, because when switched in the P2P mode, the lock time of the loop FLL, already settled, is null or almost null.

In other words, no additional time is required as the loop FLL is already locked and the device DV is already ready to go on in the P2P mode.

The catching of the phase errors due to the noise brings the loop PLL to make fluctuate the above mentioned control word of the loop FLL. Further during the transmission of the reader, the modulation of the field disturbs the clock extracted from the field so that the control of the loop FLL fluctuates precisely before switching to P2P mode, hence the interest of preferring the ideal frequency set point of the loop FLL coming from a register (here register RG) rather than keeping the last value of the loop filter LF1 which could have been too disturbed. However, keeping this last value of the filter LF1 to control the loop FLL in the P2P mode remains feasible.

Figure 7:
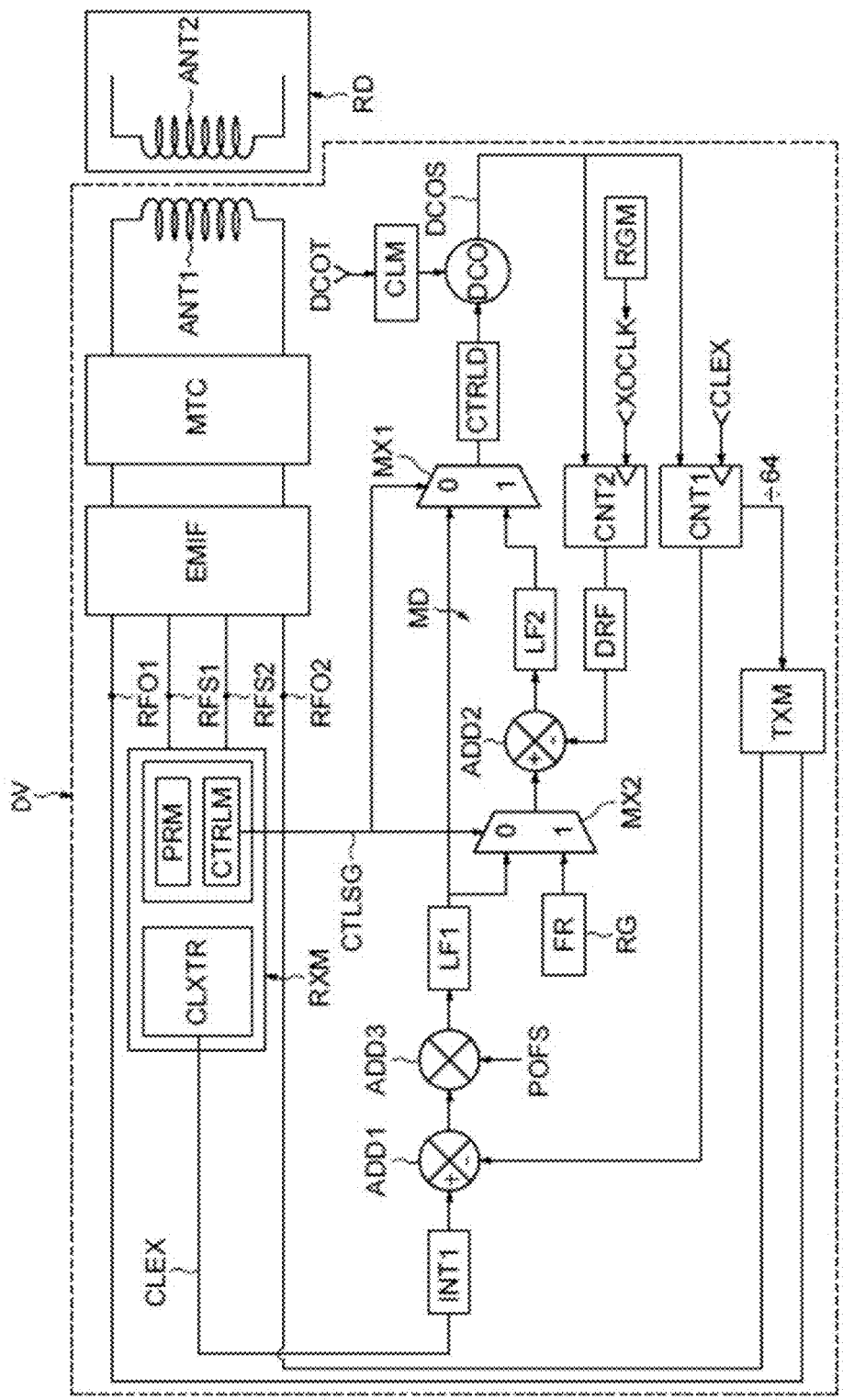
FIG. 7 illustrates another embodiment contactless communication device.

We refer now more particularly to FIG. 7 which illustrates another embodiment of a device DV.

In this embodiment, the multiplexer MX of FIG. 3 is replaced by a first multiplexer MX1 and a second multiplexer MX2.

More precisely, the first multiplexer MX1 has a first input connected to the output of the loop filter LF1 and a second input connected to the output of the loop filter LF2. The output of the first multiplexer MX1 is connected to the oscillator controller CTRLD.

The second multiplexer MX2 has a first input connected to the loop filter LF1 and a second input connected to the register RG storing the frequency set point FR. The output of the second multiplexer MX2 is connected to the adder ADD2.

Figure 8:
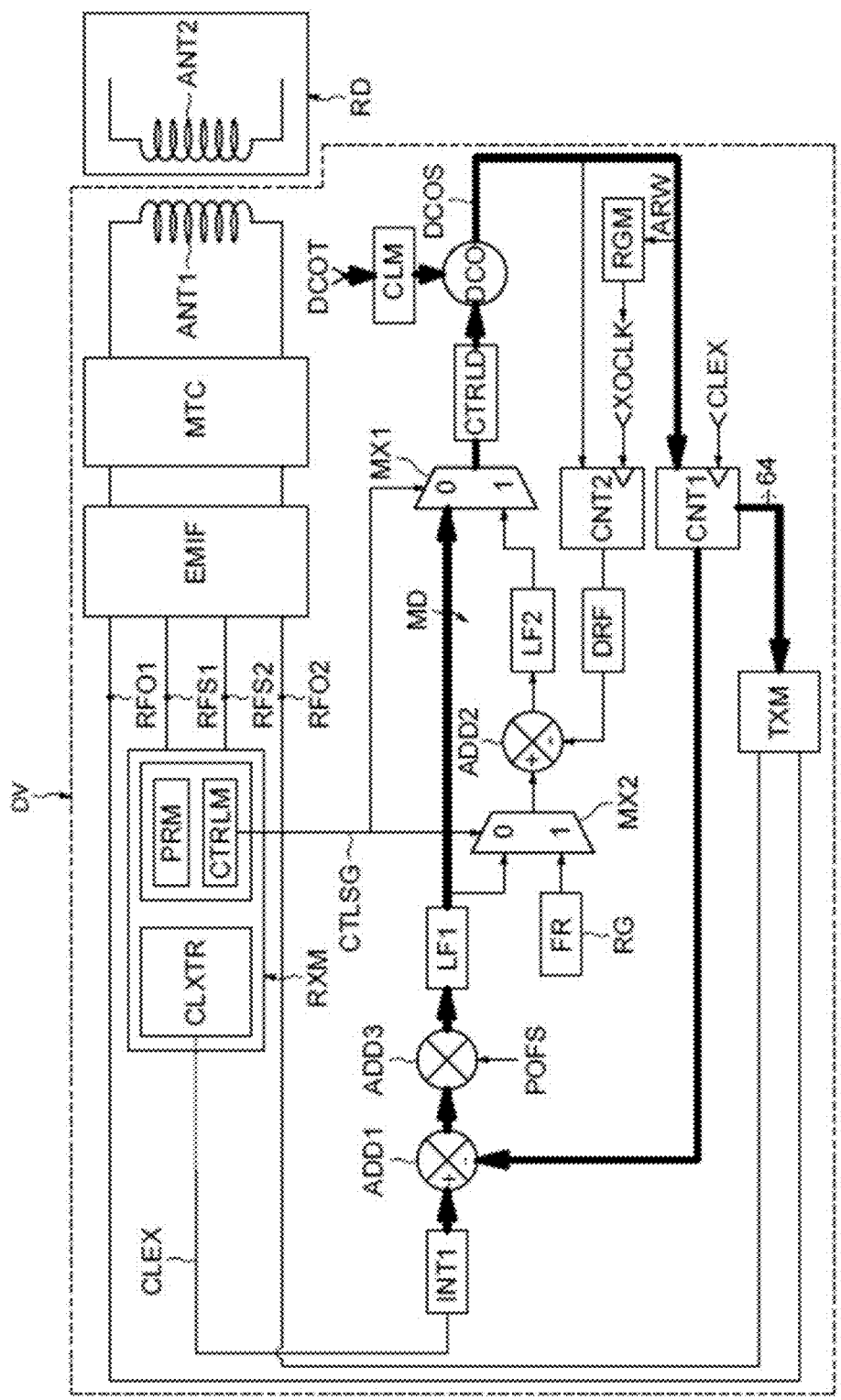
FIG. 8 illustrates the embodiment of FIG. 7 with control signal CTLSG having the value "0"

In the CE mode, at the beginning of the communication with the reader RD, the control signal CTLSG, delivered by the controller CTRLM, has value 0, which corresponds to the configuration illustrated in FIG. 8.

This is a second CE configuration.

It can be seen in this second CE configuration, that only the loop PLL operates (the loop FLL does not operate).

Figure 9:
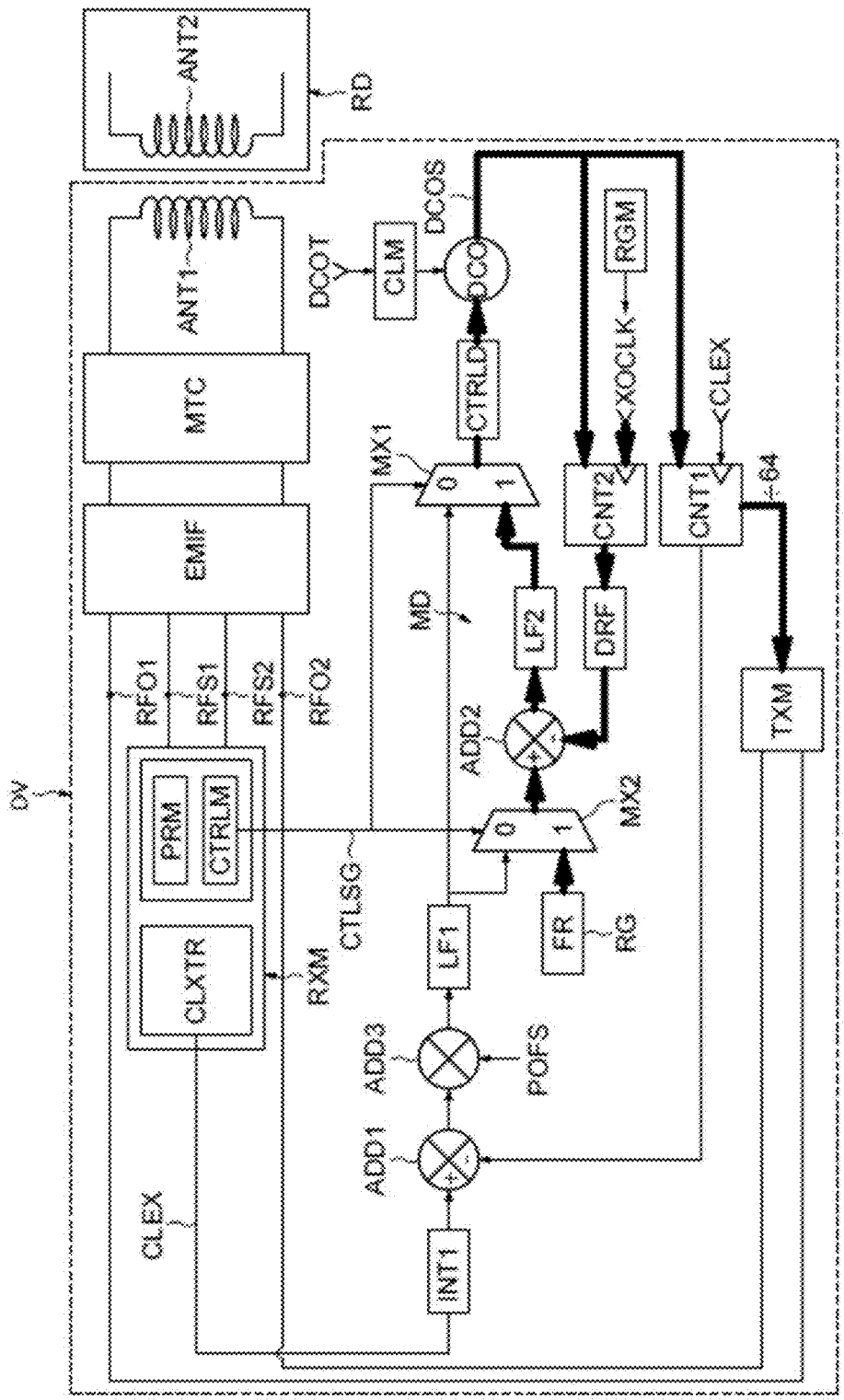
FIG. 9 illustrates the embodiment of FIG. 7 with control signal CTLSG having the value "1"

Again, the synchronization performed by the contactless device leads to a synchronization of the device clock DVCLK onto the phase and the frequency of the reader clock signal CLEX When switching in the P2P mode upon reception of the specific command ATR_REQ, the control signal CTLSG takes the value 1 leading again to the first P2P configuration illustrated in FIG. 9.

More precisely, in this first P2P configuration, the loop PLL is de-activated and only the loop FLL operates, with the reference clock signal XOCLK and the frequency set point FR stored in the register RG.

It should be noted that while in FIG. 8, the reference clock signal XOCLK is not used by the loop FLL because the loop FLL does not operate, it is necessary that this reference clock signal be ready when switching in the first P2P configuration illustrated in FIG. 9.

In this respect, at the beginning of the synchronizing performed in FIG. 8, the reference generator RGM can be switched on (arrow ARW) so that they are ready to output the reference clock signal XOCLK when switching in the P2P mode.

In this embodiment, as the frequency of the oscillator DCO has been calibrated to the targeted frequency at the end of the synchronizing phase, the device DV is again ready to switch in the P2P mode in less than 56 µs, for example in 12 µs.

Nevertheless in the embodiment of FIGS. 3, 5 and 6 there is no disturbance of the output clock of the ALM when switching into the P2P mode, while a slight disturbance may occur in the embodiment of FIGS. 7-9.

Thus the embodiment of FIGS. 3, 5 and 6 is more robust than the embodiment of FIGS. 7-9 for this transition from CE mode to P2P mode.

The architecture of the contactless device, which includes a configurable module MD having the two loops PLL and FLL, is also compatible with a configuration of the contactless device as a P2P initiator (P2P reader).

Figure 10:
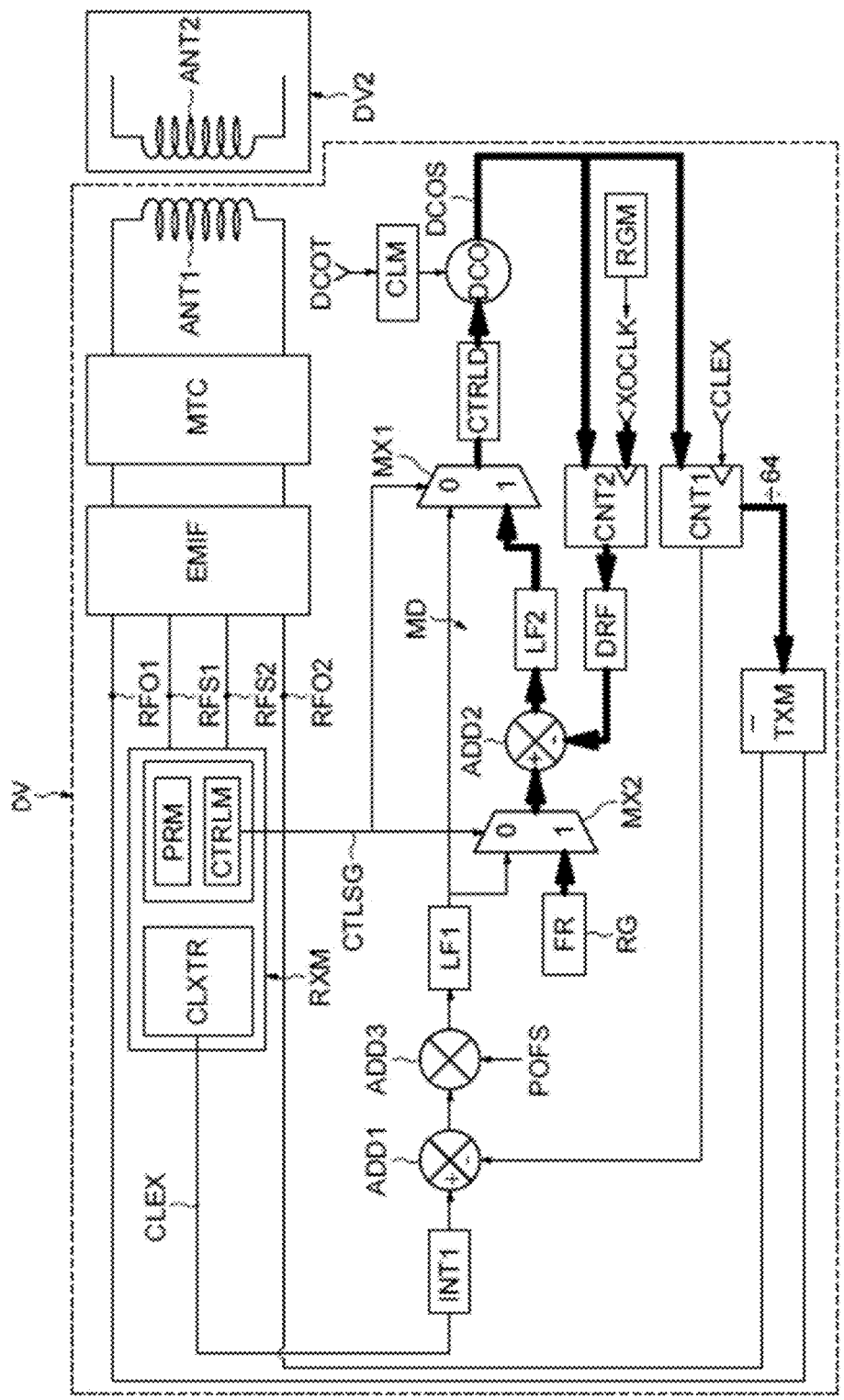
FIG. 10 illustrates a second P2P configuration in which the device DV acts as a P2P initiator.

For example, FIG. 10 is a second P2P configuration corresponds in which the device DV acts as a P2P initiator for communicating with another contactless device DV2, for example another mobile phone.

FIG. 10 corresponds here to the embodiment of FIG. 3, when the control signal CTLSG takes the value 1.

Thus only the loop FLL operates with the reference clock signal XOCLK and the desired frequency set point FR stored in the register RG leading thus to the outputting of the device clock signal DVCLK having a frequency equal to the desired frequency (13.56 MHz).

What is claimed is:

1. A method of managing operation of a contactless communication device, the contactless communication device configured to support a card emulation mode using active load modulation (ALM) and a peer to peer mode, and comprising a phase locked loop and a frequency locked loop having in common a same controlled oscillator, the method comprising:

firstly placing the contactless communication device in the card emulation mode at a beginning of a communication between the contactless communication device and a contactless reader, the firstly placing comprising synchronizing, within the contactless communication device, an ALM carrier frequency with a reader carrier frequency by operating at least the phase locked loop; and upon reception by the contactless communication device of an indication sent by the contactless reader indicating a further communication in the peer to peer mode with the contactless reader, secondly placing the contactless communication device in the peer to peer mode, the secondly placing including deactivating the phase locked loop and operating the frequency locked loop with a reference clock signal and a frequency set point based on the reader carrier frequency and a frequency of the reference clock signal.

2. The method according to claim 1, wherein the controlled oscillator is controlled for outputting an output oscillator signal having a frequency equal to the reader carrier frequency or to a multiple of the reader carrier frequency, and the frequency set point is a ratio between the frequency of the output oscillator signal and the frequency of the reference clock signal.

3. The method according to claim 1, wherein the reference clock signal is provided by a reference clock generator, wherein the firstly placing comprises not operating the frequency locked loop and switching on the reference clock generator for it to be ready to deliver the reference clock signal to the frequency locked loop during the secondly placing.

4. The method according to claim 1, wherein the synchronizing includes also operating the frequency locked loop with the reference clock signal.

5. The method according to claim 1, further comprising storing the frequency set point in a memory.

6. A method of managing operation of a contactless communication device, the contactless communication device configured to support a card emulation mode using active load modulation (ALM) and a peer to peer mode, and comprising a phase locked loop and a frequency locked loop having in common a same controlled oscillator, the method comprising:

configuring the contactless communication device as a peer to peer reader, the configuring comprising, without using the phase locked loop, operating the frequency locked loop with a reference clock signal and a frequency set point based on a desired reader carrier frequency and a frequency of the reference clock signal.

7. The method according to claim 6, wherein the controlled oscillator is controlled for outputting an output oscillator signal having a frequency equal to the desired reader carrier frequency or to a multiple of the desired reader carrier frequency, and the frequency set point is a ratio between the frequency of the output oscillator signal and the frequency of the reference clock signal.

8. The method according to claim 6, further comprising storing the frequency set point in a memory.

9. A contactless communication device, configured to support a card emulation mode using active load modulation (ALM) and a peer to peer mode, the contactless communication device comprising:

a configurable module including a phase locked loop and a frequency locked loop having in common a same controlled oscillator, the configurable module having a first card emulation configuration in which the phase locked loop operates and the frequency locked loop operates with a reference clock signal, for synchronizing an ALM carrier frequency with a reader carrier frequency, and a first peer-to-peer configuration in which only the frequency locked loop operates with the reference clock signal and a frequency set point depending on the reader carrier frequency and a frequency of the reference clock signal; and a controller configured for placing the configurable module in the first card emulation configuration at a beginning of a communication between the contactless communication device and a contactless reader, and for placing the configurable module in the first peer to peer configuration upon reception by the contactless communication device of an indication sent by the contactless reader indicating a further communication in the peer to peer mode with the contactless reader.

10. The contactless communication device according to claim 9, wherein the controlled oscillator is configured to output an output oscillator signal having a frequency equal to the reader carrier frequency or to a multiple of the reader carrier frequency, and the frequency set point is a ratio between the frequency of the output oscillator signal and the frequency of the reference clock signal.

11. The contactless communication device according to claim 9, further comprising a memory configured for storing the frequency set point.

12. The contactless communication device according to claim 9, wherein the contactless communication device is a mobile phone.

13. A contactless communication device, configured to support a card emulation mode using active load modulation (ALM) and a peer to peer mode, the contactless communication device comprising:

a configurable module including a phase locked loop and a frequency locked loop having in common a same controlled oscillator, the configurable module having a second card emulation configuration in which only the phase locked loop operates for synchronizing an ALM carrier frequency with a reader carrier frequency, and a first peer-to-peer configuration in which only the frequency locked loop operates with a reference clock signal and a frequency set point depending on the reader carrier frequency and a frequency of the reference clock signal; and a controller configured for placing the configurable module in the second card emulation configuration at a beginning of a communication between the contactless communication device and a contactless reader, and for placing the configurable module in the first peer-to-peer configuration upon reception by the contactless communication device of an indication sent by the contactless reader indicating a further communication in the peer to peer mode with the contactless reader.

14. The contactless communication device according to claim 13, further comprising a reference clock generator configured, when switched on, to provide the reference clock signal, wherein the controller is configured, when the configurable module is placed in the second card emulation configuration, to switch on the reference clock generator for it to be ready to deliver the reference clock signal to the frequency locked loop when the configurable module switches in its first peer-to-peer configuration.

15. The contactless communication device according to claim 13, wherein the controlled oscillator is configured to output an output oscillator signal having a frequency equal to the reader carrier frequency or to a multiple of the reader carrier frequency, and the frequency set point is a ratio between the frequency of the output oscillator signal and the frequency of the reference clock signal.

16. The contactless communication device according to claim 13, further comprising a memory configured for storing the frequency set point.

17. The contactless communication device according to claim 13, wherein the contactless communication device is a mobile phone.

18. A contactless communication device, configured to support a card emulation mode using active load modulation (ALM) and a peer to peer mode, the contactless communication device comprising:

a configurable module including a phase locked loop and a frequency locked loop having in common a same controlled oscillator, the configurable module having a second peer to peer configuration in which only the frequency locked loop operates with a reference clock signal and a frequency set point depending on a desired reader carrier frequency and a frequency of the reference clock signal; and a controller configured for placing the configurable module in the second peer to peer configuration for making the contactless communication device acting as a peer to peer reader.

19. The contactless communication device according to claim 18, wherein the controlled oscillator is configured to output an output oscillator signal having a frequency equal to the desired reader carrier frequency or to a multiple of the desired reader carrier frequency, and the frequency set point is a ratio between the frequency of the output oscillator signal and the frequency of the reference clock signal.

20. The contactless communication device according to claim 18, further comprising a memory configured for storing the frequency set point.

21. The contactless communication device according to claim 18, wherein the contactless communication device is a mobile phone.

* * * * *